(12) United States Patent
Kliger et al.

(10) Patent No.: US 8,254,413 B2
(45) Date of Patent: Aug. 28, 2012

(54) SYSTEMS AND METHODS FOR PHYSICAL LAYER ("PHY") CONCATENATION IN A MULTIMEDIA OVER COAX ALLIANCE NETWORK

(75) Inventors: Avraham Kliger, Ramat Gan (IL); Philippe Klein, Jerusalem (IL); Yitshak Ohana, Givat Zeev (IL)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 12/636,930

(22) Filed: Dec. 14, 2009

(65) Prior Publication Data

US 2010/0158021 A1  Jun. 24, 2010

Related U.S. Application Data

(60) Provisional application No. 61/140,052, filed on Dec. 22, 2008.

(51) Int. Cl.
*H04J 1/00* (2006.01)
(52) U.S. Cl. .......... 370/480; 370/352; 725/111
(58) Field of Classification Search .......... 725/111
See application file for complete search history.

(56) References Cited

U.S. PATENT DOCUMENTS

| | | | |
|---|---|---|---|
| 3,836,888 A | 9/1974 | Boenke et al. | |
| 4,413,229 A | 11/1983 | Grant | |
| 4,536,875 A | 8/1985 | Kume et al. | |
| 4,608,685 A | 8/1986 | Jain et al. | |
| 4,893,326 A | 1/1990 | Duran et al. | |
| 5,052,029 A | 9/1991 | James et al. | |
| 5,170,415 A | 12/1992 | Yoshida et al. | |
| 5,343,240 A | 8/1994 | Yu | |
| 5,421,030 A | 5/1995 | Baran | |
| 5,440,335 A | 8/1995 | Beveridge | |
| 5,570,355 A | 10/1996 | Dail et al. | |
| 5,638,374 A | 6/1997 | Heath | |
| 5,671,220 A | 9/1997 | Tonomura | |
| 5,796,739 A | 8/1998 | Kim et al. | |
| 5,802,173 A | 9/1998 | Hamilton-Piercy et al. | |
| 5,805,591 A | 9/1998 | Naboulsi et al. | |
| 5,805,806 A | 9/1998 | McArthur | |
| 5,815,662 A | 9/1998 | Ong | |

(Continued)

FOREIGN PATENT DOCUMENTS

EP    0 385695    9/1990

(Continued)

OTHER PUBLICATIONS

International Search Report for International Application No. PCT/US03/27253 dated Dec. 30, 2003 (4 pgs.).

(Continued)

*Primary Examiner* — Duc C Ho
(74) *Attorney, Agent, or Firm* — Weiss & Arons LLP

(57) ABSTRACT

Systems and methods for concatenating messages in MoCA devices that are connected via a coax network are provided. One embodiment of a system according to the invention includes a home network having a plurality of nodes. The network is implemented over coaxial cable. The network includes a plurality of networked nodes. A transmitter of at least one of the networked nodes is configurable to transmit a concatenated burst. The concatenated burst includes a preamble, a first payload frame and a second payload frame. The first payload frame and the second payload frame are separated by a cyclic prefix of a first symbol of the second payload frame.

12 Claims, 6 Drawing Sheets

U.S. PATENT DOCUMENTS

| | | | |
|---|---|---|---|
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 * | 11/2005 | Quigley et al. ............... 370/252 |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,675,970 B2 | 3/2010 | Nemiroff et al. |
| 7,783,259 B2 | 8/2010 | Dessert et al. |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leathurbury |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0060207 A1 | 3/2003 | Sugaya et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 * | 3/2004 | Eidson ............... 370/203 |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne, III |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0116055 A1 * | 5/2007 | Atsumi et al. ............... 370/476 |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037589 A1 | 2/2008 | Kliger |
| 2008/0080369 A1 | 4/2008 | Sumioka et al. |
| 2008/0089268 A1 | 4/2008 | Kinder et al. |
| 2008/0117919 A1 | 5/2008 | Kliger |
| 2008/0117929 A1 | 5/2008 | Kliger |
| 2008/0130779 A1 | 6/2008 | Levi |
| 2008/0178229 A1 | 7/2008 | Kliger |
| 2008/0189431 A1 | 8/2008 | Hyslop et al. |
| 2008/0225832 A1 | 9/2008 | Kaplan et al. |
| 2008/0238016 A1 | 10/2008 | Chen et al. |
| 2008/0259957 A1 | 10/2008 | Kliger |
| 2008/0271094 A1 | 10/2008 | Kliger |
| 2008/0273591 A1 | 11/2008 | Brooks et al. |
| 2008/0279219 A1 | 11/2008 | Wu et al. |

| | | |
|---|---|---|
| 2008/0298241 A1 | 12/2008 | Ohana |
| 2009/0010263 A1 | 1/2009 | Ma et al. |
| 2009/0063878 A1 | 3/2009 | Schmidt et al. |
| 2009/0092154 A1 | 4/2009 | Malik et al. |
| 2009/0122901 A1 | 5/2009 | Choi et al. |
| 2009/0165070 A1 | 6/2009 | McMullin |
| 2009/0217325 A1 | 8/2009 | Kliger |
| 2009/0254794 A1* | 10/2009 | Malik et al. .................. 714/776 |
| 2009/0257483 A1 | 10/2009 | French et al. |
| 2009/0279643 A1 | 11/2009 | Shusterman |
| 2009/0316589 A1 | 12/2009 | Shafeeu |
| 2010/0031297 A1 | 2/2010 | Klein |
| 2010/0080312 A1 | 4/2010 | Moffatt et al. |
| 2010/0150016 A1 | 6/2010 | Barr |
| 2010/0158013 A1 | 6/2010 | Kliger |
| 2010/0158015 A1 | 6/2010 | Wu |
| 2010/0158022 A1 | 6/2010 | Kliger |
| 2010/0174824 A1 | 7/2010 | Aloni et al. |
| 2010/0185731 A1 | 7/2010 | Wu |
| 2010/0238932 A1 | 9/2010 | Kliger |
| 2010/0246586 A1 | 9/2010 | Ohana |
| 2010/0254278 A1 | 10/2010 | Kliger |
| 2010/0254402 A1 | 10/2010 | Kliger |
| 2010/0281195 A1 | 11/2010 | Daniel et al. |
| 2010/0284474 A1 | 11/2010 | Kliger |
| 2010/0290461 A1 | 11/2010 | Kliger |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0310907 A1 | 12/2011 | Klein et al. |

FOREIGN PATENT DOCUMENTS

| | | |
|---|---|---|
| EP | 0 622926 | 11/1994 |
| EP | 1501326 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27254 dated Feb. 3, 2004 (5 pgs.).

Multichannel News , MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar. 29, 2009.

Ovadia S., "MoCA: Ubiquitous Multimedia Networking In the Home," Proceedings of the SPIE—The International Society for Optical Engineering SPIE—The International Society for Optical Engineering USA, [Online] 2007, XP002584642 ISSN: 0277-786X, Retrieved on Jul. 28, 2010 from the Internet: URL: http://spiedl.aip.org//getpdf/servlet/getPDFServlet?filetype=pdf&id=PSISDG006776000000167760C00000&idtype=cvips&prog=normal>, as cited in European Search Report.

"Home Networking on Coax for Video and Multimedia, Overview for IEEE 802.1AVB", Shlomo Ovadia, San Ramon/California, May 30, 2007.

* cited by examiner

SYSTEMS AND METHODS FOR PHYSICAL LAYER ("PHY") CONCATENATION IN A MULTIMEDIA OVER COAX ALLIANCE NETWORK

CROSS-REFERENCED TO RELATED APPLICATIONS

This application claims priority from U.S. Provisional Patent Application No. 61/140,052, filed Dec. 22, 2008, entitled "MoCA 2.0 PHY Concatenation," which is hereby incorporated by reference herein in its entirety.

FIELD OF TECHNOLOGY

The present invention relates generally to information networks and specifically to transmitting information such as media information over communication lines such as coaxial cable (hereinafter "coax"), thereby to form a communications network.

BACKGROUND OF THE INVENTION

Home network technologies using coax are known generally. The Multimedia over Coax Alliance (MoCA™), at its website mocalliance.org, provides an example of a suitable specification (MoCA 1.1) for networking of digital video and entertainment through existing coaxial cable in the home which has been distributed to an open membership. The MoCA 1.1 specification is incorporated by reference herein in its entirety.

Home networking over coax taps into the vast amounts of unused bandwidth available on the in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 Mhz for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with cable functionalities, on different frequencies.

It would be desirable to reduce latency and increase throughput by concatenating packets in a MoCA home network.

SUMMARY OF THE INVENTION

A system and/or method for reducing latency and/or increasing throughput by concatenating packets in a MoCA home network, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
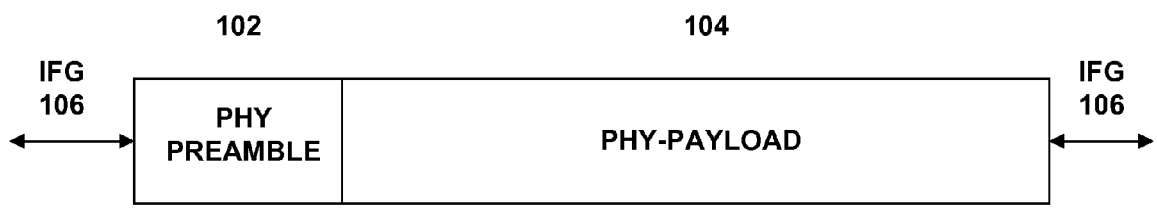
FIG. 1 is a conventional non-concatenated PHY-Frame transmission.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical wave guides, optical fibers, and/or wireless transmission media (e.g., air and/or space).

In a MoCA network environment, the traffic transmitted by a node is a mix of multiple video streams addressed to multiple destination devices and concurrent video and data transmissions. In conventional MoCA systems, each priority and each unicast flow (both of which are described in more detail below) are typically transmitted separately. Each transmission generates overhead which in turn reduces the effective data transmission bandwidth of the network.

This application describes systems and methods for maximizing bandwidth available to MoCA devices by concatenating either the data transmission packets that form parts of bursts addressed to different nodes or the data transmission packets that form part of bursts of different priorities. The bursts may include additional transmission time overhead in the form of inter-frame gaps that are required between each two bursts and burst preambles that are required before the beginning of each burst. In the MoCA 1.x Specification, these bursts are transmitted as individual bursts. Concatenation of the data transmission packets in multiple bursts significantly reduces the overhead associated with the Inter-Frame gaps and the burst preambles.

Systems and methods according to the invention preferably allow more video streams and/or higher definition video streams to run simultaneously in a home environment. Such systems and methods preferably also provide an enhanced user experience when interactive real-time applications run in concurrence with time-bound services. Examples of such interactive applications running in concurrence with time-bound services may include participating in networked gaming and/or internet surfing while watching HD movies on multiple TV sets.

For ease of reference, the following glossary provides definitions for the various abbreviations and notations used in this patent application:
ARP Address Resolution Protocol
DAU Data Allocation Unit
digital PHY Includes a port of the MoCA integrated circuit that forms a conduit for signals to and from a receiver and/or transceiver integrated circuit
EN MoCA Existing Node (the term "node" may be referred to alternatively herein as a "module")
IE Information Element
IFG Inter-Frame Gap
IDFT Inverse Discrete Fourier Transform
MAC Media Access Controller—includes logic for MoCA integrated circuit that schedules opening and closing of the digital PHY as needed for transmission and/or receiving signals from the receiver and/or transceiver integrated circuit
MAP Media Access Plan
MPDU MAC Protocol Data Unit
NC MoCA Network Controller
OFDM Orthogonal Frequency Division Multiplexing
OFDMA Orthogonal Frequency Division Multiplexing Allocation
PHY Physical Layer of MoCA Network
PQoS Provisioned Quality of Service
RO Reservation Request Opportunity
RR Reservation Request Message
STB Set Top Box It should be noted that, for the purposes of this application, "aggregation" refers to a process implemented by the EN when the EN receives a plurality of packets and requests opportunities to transmit the packets ("TxOPs"). An EN may request several TxOPs for frames for transmission of packets that have been aggregated at the EN.

"Concatenation" refers to a process implemented by the NC which can concatenate several aggregated packets at an EN into a single frame. Concatenation of two communication bursts into one burst reduces the PHY overhead. Such overhead may be characterized in terms of bandwidth on the network.

In one embodiment of the invention, such concatenation may reduce the overhead by one preamble and one IFG for each concatenated packet, as will be explained below in more detail in the portion of the specification corresponding to FIGS. 1 and 2.

In a MoCA network according to the invention there exists a trade-off between latency of data transmission packet delivery and packet aggregation level—i.e., concatenation of packets. A frame including the data packet can be transmitted either in each MAP cycle (unconcatenated) or aggregated and sent every n MAP cycles (concatenated). Thus, under conditions where more latency can be tolerated by the transmissions, the aggregation can be increased, thereby reducing system overhead.

PHY-Level concatenation of data PHY-Frame payloads according to the invention follows. This application specifies the optional capability for PHY-Level concatenation, which nodes may support. When supported, nodes should preferably be capable of transmitting and receiving concatenated payloads, as can be scheduled by the NC.

There are two types of PHY Concatenation according to the invention: unicast—i.e., from a single transmitting node to a single receiving node—and broadcast—i.e., from a single transmitting node to all nodes on the network.

Concatenation for a unicast transmission may apply when the bursts to be concatenated are directed to the same destination independent of whether the bursts have the same priority or different priority. Such a method may concatenate two or more payloads into a single burst.

Concatenation for a broadcast transmission applies when the bursts are sent to more than one destination. Such methods may send the concatenated payloads as a broadcast profile. A broadcast transmission may optimize the PHY transmission parameters—e.g., bit loading, gain, prefix, etc.—for a broadcast profile.

In certain embodiments of MoCA networks, for the packets with high relative priority level, an EN may request a high priority reservation because the possibility exists that the NC will provide a grant only for high priority packets. If there is enough bandwidth for all requests including low level priority packets, the NC may concatenate the packets of an individual EN, into a single burst. Such concatenation may be applicable to unicast and or broadcast transmissions.

The following description and FIGUREs are directed to embodiments of concatenation according to the invention. It should be noted that MAP scheduling of concatenated payloads according to the invention may be an optional feature. Thus, the NC may elect to schedule concatenation of payloads between capable nodes, but the NC is not required to do so.

The construction of individual, non-concatenated, Data/Control PHY-Frame payloads is as follows.

FIG. 1 shows an exemplary, non-concatenated, PHY-Frame transmission. The transmission 100 includes a preamble 102 followed immediately by a single payload 104, between successive IFGs 106.

Because a concatenated frame according to the invention does not require preamble, each concatenated frame may eliminate one IFG and one preamble. For example, using systems and methods according to the invention, the NC may schedule, between two successive IFGs, a single preamble immediately followed by a concatenation of up to four (4) of what would otherwise be individual Data/Control PHY-Frame payloads, each of which should preferably be constructed separately. In other embodiments of the invention, even more than four payloads may be concatenated.

Figure 2:
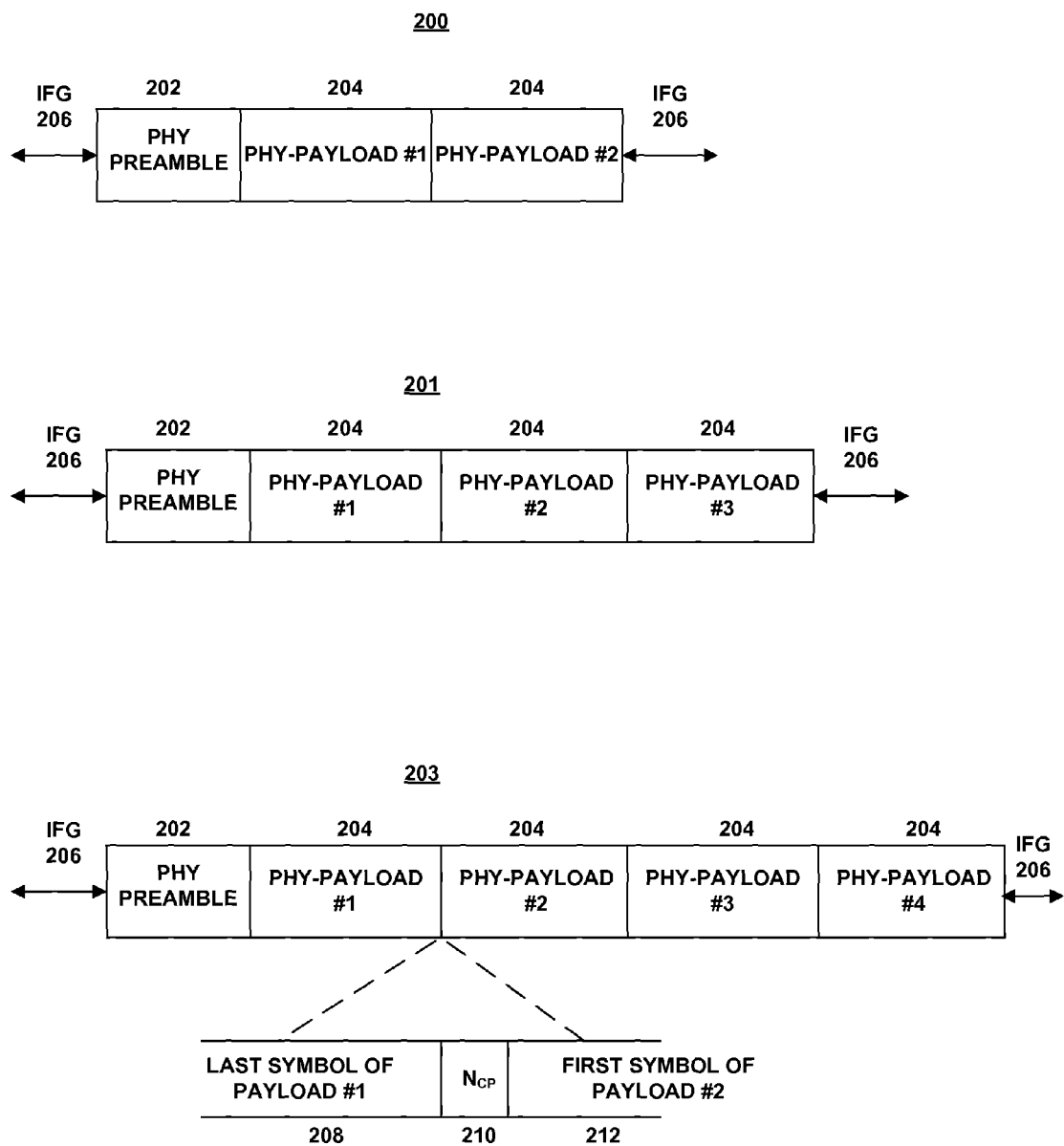
FIG. 2 a group of exemplary concatenated PHY-Frame transmissions according to the invention.

Examples of such concatenated transmissions are depicted in FIG. 2, starting with the minimum of two concatenated payloads, up to the maximum of four. Note that each concatenated payload: is an integer number of symbols; starts a new advance encryption standard ("AES") cypher block chaining ("CBC") message (if Privacy is enabled); has independent FEC optimization; resets the data-scrambler (each byte in the OFDM symbol padded frame should preferably be scrambled using the pseudorandom sequence generated by, for example, the 23rd-order polynomial $X^{23}+X^5+1$); and resets the constellation bin-scrambler (the phase of every used subcarrier—i.e., every subcarrier modulated with one or more PHY payload bits—should preferably be scrambled, for example, using the $15^{th}$-order pseudorandom noise (PN-15) sequence defined by the generator polynomial: $X^{15}+X+1$.)

As stated above, FIG. 2 shows exemplary transmissions of PHY-Level Concatenated Data PHY-Frame payloads. These transmissions include transmissions 200, 201 and 203.

Each of transmissions 200, 201 and 203 is shown with a single preamble 202 and multiple, concatenated payloads 204. Each of the transmissions is also shown disposed between two IFGs 206. In addition, between the last symbol of a first exemplary payload—208—and the first symbol of a second exemplary payload—212—an $N_{cp}$ (cyclic prefix length) 210 is included.

After the first payload in a concatenated packet, each concatenated payload should immediately follow the previous payload and begin with the cyclic prefix of the first symbol of the payload (see, $N_{CP}$ 210 in FIG. 2).

Figure 3:
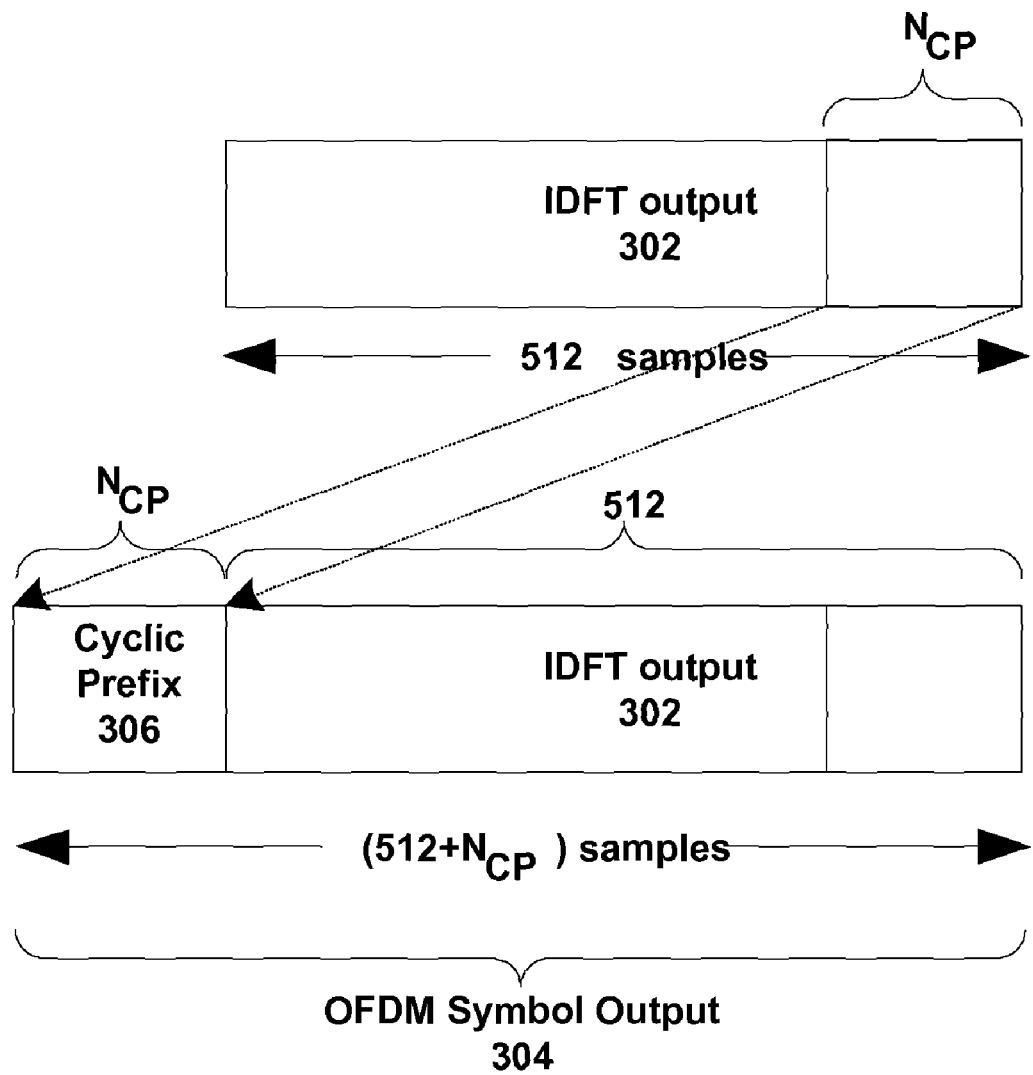
FIG. 3 is a schematic diagram of a cyclic prefix.

FIG. 3 shows a schematic diagram of insertion of a cyclic prefix 300. During a transformation of the OFDM symbol (which is the building block of the packet) from the frequency domain to the time domain, as part of OFDM modulation, a cyclic prefix is added to the OFDM symbol, as follows:

The process of OFDM modulation transforms $N_{SYM}$ sets of $N_{FFT}$ frequency-domain subcarriers into a set of $N_{SYM}$ OFDM modulation symbols, each consisting of $N_{FFT}+N_{CP}$ time-domain samples. The modulation mechanism should preferably be functionally equivalent to the reference model described in the equations below. The stream of complex numbers input to an OFDM modulator are converted to time domain samples by computing an IDFT output, in response to an OFDM input symbol, on blocks of 512 complex numbers $X[n]=(I_n+jQ_n)$. The operation is mathematically defined for the $N_{FFT}$-point frequency domain symbol of X[n] as follows:

$$x[k] = \frac{1}{\sqrt{N}} \sum_{n=0}^{N-1} X[n]W_N^{-kn}, 0 \leq k \leq N-1$$

and $$W_N^{kn} = e^{-j2\pi kn/N}$$

with $N=N_{FFT}=512$ and n representing the subcarrier index.

An IDFT output 302 is transformed into an OFDM output symbol 304. In order to form the OFDM output symbol 304 from an IDFT output 302, the last $N_{CP}$ samples of IDFT output 302 are preferably copied and prepended to form one OFDM output symbol 304. The cyclic prefix length $N_{CP}$ should preferably not vary for all PHY-payload symbols within a particular PHY-frame.

Figure 4:
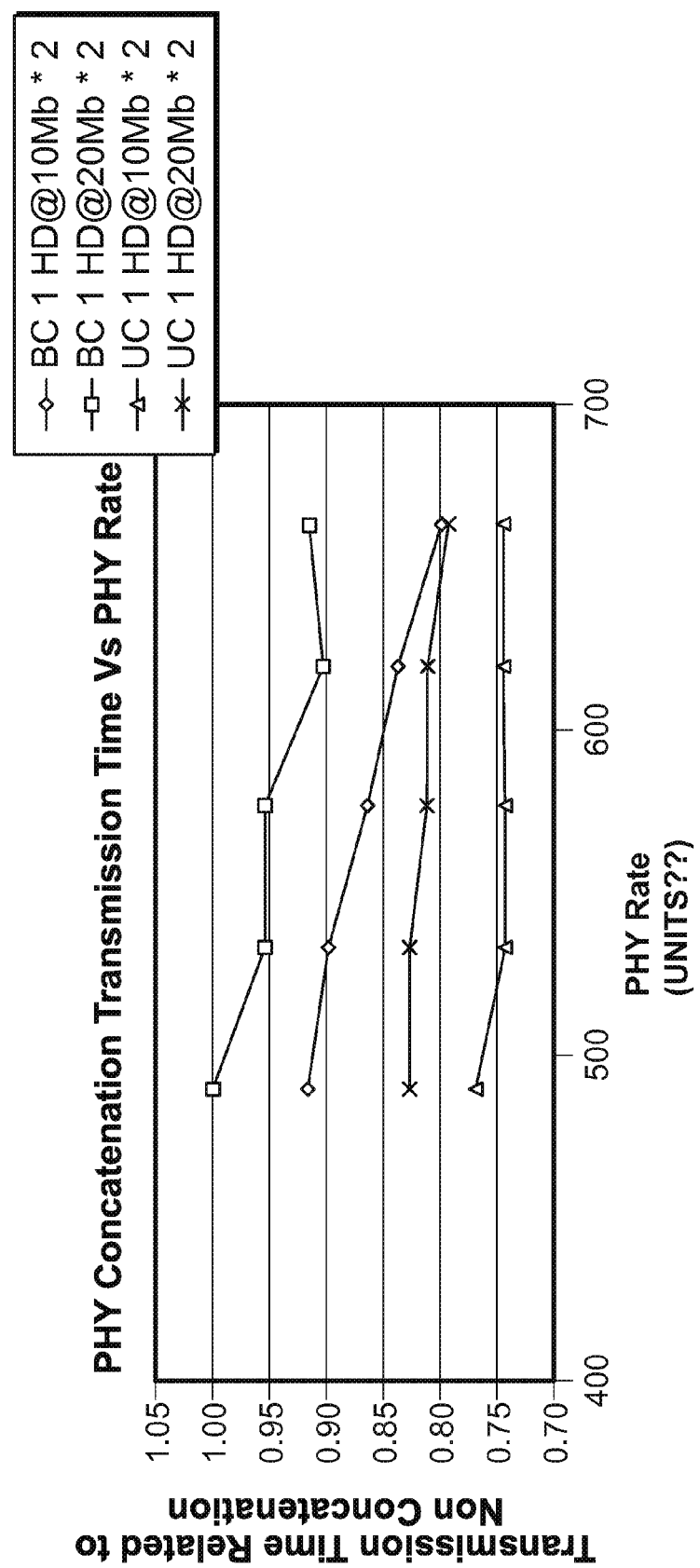
FIG. 4 is a chart that illustrates performance improvement attributable to concatenation versus the PHY Rate (unconcatenated)

FIG. 4 is a chart that illustrates performance improvement attributable to concatenation as plotted against the PHY Rate. The x-axis represents the PHY Rate. The y-axis represents a ratio of time required for concatenated transmission of select, predetermined data flows to time for unconcatenated transmission of the same select, predetermined data flows.

Each of the groups of data points correspond to different scenarios, as set forth in the legend. The uppermost set of data points in the legend corresponds to a broadcast transmission of two flows of high definition video at 10 megabits per second. The next set of data points corresponds to a broadcast transmission of two flows of high definition video at 20 megabits per second. The next set of data points corresponds to a unicast transmission of two flows of high definition video at 10 megabits per second. The next set of data points corresponds to a unicast transmission of two flows of high definition video at 20 megabits per second.

The chart in FIG. 4 illustrates a number of points. First, because the great majority of the data points are at some number less than 1.00 on the y-axis, the charted information illustrates that the time required to transmit using concatenated transmission is less than the time required to transmit using unconcatenated transmission.

Furthermore, the downward trend, as the data points move along the x-axis indicates that, as the PHY rate increases, the time savings attributable to concatenation increases as well. This is due, at least in part, to constancy of the IFG at the greater PHY rates even though the actual data requires less time to transmit, thus improving the relative overhead savings of concatenation.

In addition to the foregoing, the NC may schedule a concatenated transmission when the following constraints are satisfied:

All concatenated payloads are generated using the same transmitting node;

All concatenated payloads have the same DESTINATION_NODE_ID value in the MoCA Header, which is typically between 0~15, or 128~254, inclusive of the endpoints;

The source and all destination nodes advertise the concatenation capability in Bit 10 of NODE_PROTOCOL_SUPPORT;

All concatenated payloads use identical PHY Profiles—i.e., same bitloading, $N_{CP}$, Transmit Power Control ("TPC") setting;

All concatenated multicast payloads have the same level of priority;

None of the concatenated payloads is a control packet;

If privacy is enabled, all concatenated payloads use the same AES key value;

Preferably only the first concatenated payload may be the remaining fragment from a previous transmission; and, Preferably only the last concatenated payload may be the first fragment of an NC-scheduled fragmentation.

As described above, embodiments of concatenation according to the invention may reduce the overhead to an amount quantified by one preamble and one IFG per concatenated payload. A preamble may use between 20 and 30 micro seconds ("uSec") during the transmission of each communication burst. An IFG for use before and/or after a Data/Control PHY-frame communication burst—which transport MAC frames in the payload such as application-layer data and MoCA network control information—can be about 5 uSec in duration. An IFG before and/or after a Probe PHY-frame communication burst—which transport specialized payloads to facilitate medium characterization such as channel assessment and link characterization to optimize PHY-layer performance—can be about 24 uSec in duration. An IFG before and/or after an OFDMA PHY-Frame communication burst can be about 5 uSec in duration.

In unicast transmissions according to the invention, the NC can concatenate all of an EN's RRs and Opportunistic RRs ("ORRs") into a single burst. With respect to ORR elements used for PQoS aggregation and/or concatenation, the transmitter should specify the smallest Time to Live (TTL) value of the packets in the aggregate and set a maximum aggregation flag, or other suitable mechanism, to 1 if the aggregate has reached either the maximum aggregation size or the maximum aggregation packet number. The NC may take account of these parameters in transmission scheduling. This may also increase throughput when policing PQoS.

In some embodiments of the invention, each payload may be terminated with a shortened FEC and OFDM padding—e.g., filling the payload portion of the burst with zero data as needed to equalize the length of payload portions of the burst. Such techniques preferably allow filtering of the packets to be done in the PHY level. Such filtering at the PHY level may allow the node to determine whether to receive the burst or not.

If the NC opts to schedule concatenated payloads according to the invention, the NC should preferably follow all inclusion rules as specified below.

Such rules may include the following. If a prioritized flow, as defined by {source, destination, priority}, meets some criteria, the transmitter node may reserve bandwidth in advance for upcoming data packets. As described above, such advance reservation may be implemented as an ORR.

An ORR may reserve bandwidth for data packets in one or both of the following two cases: prioritized data packets which are currently not in the transmit buffer but may arrive before the granted transmission time in the next MAP cycle; and PQoS packets which are currently in the transmit buffer but can tolerate a certain delay prior to transmission. The criteria for applying an ORR on a prioritized flow can be vendor specific. The bandwidth requested by ORRs is based on traffic prediction.

The transmitter typically does not use an RR to reserve bandwidth for upcoming data packets. Rather, the transmitter typically uses an RR to reserve bandwidth for data packets currently pending in the transmit buffer. In addition, the transmitter preferably sends ORR elements in a Reservation Request frame only when the RR has included regular RR elements for all the pending prioritized packets.

If a prioritized ORR element is granted by the NC, the transmitter should preferably form an aggregate packet out of the buffered data packets of the corresponding flow and transmit the aggregate packet to the receiver during the granted interval. The transmission time of the aggregated packet should preferably not exceed the granted time interval. If the actual transmission time of the aggregated packet is shorter than the granted interval, padding bits should be applied to the aggregated packet so that the granted interval is fully utilized. If the transmitter has no data packets to transmit during the granted period, it should preferably transmit a dummy MAC frame with padding bits to the receiver.

Each PQoS flow is associated with a maximum latency limitation and thus each PQoS packet is associated with a Time-to-live (TTL) value. For PQoS packets currently pending in the transmit buffer but with a TTL value less than about two MAP cycle lengths, the transmitter preferably uses RRs to reserve bandwidth. Otherwise, the transmitter may use ORRs to reserve bandwidth for PQoS packets. The transmitter preferably does not reserve bandwidth for upcoming PQoS packets in advance. The bandwidth requested by a PQoS ORR may be based on actual size of all pending QoS packets.

If a PQoS ORR element is granted by the NC, the transmitter processes it in the same way as a granted RR element.

Upon reception of the RR and ORR elements from all the nodes, the NC should preferably grant the requests according to the following order:

1. PQoS RR elements;
2. PQoS ORR elements if the total granted PQoS bandwidth is less than some predetermined threshold percentage—e.g., 80%—of the next MAP cycle data bandwidth. The MAP cycle data bandwidth is defined as the sum of all the data MPDU transmission durations (including preamble and IFG of each data MPDU transmission);
3. High Priority RR elements;
4. Medium Priority RR elements;
5. Low Priority RR elements;
6. Background Priority RR elements;
7. PQoS ORR elements;
8. High Priority ORR elements.
9. Medium Priority ORR elements.
10. Low Priority ORR elements.
11. Background Priority ORR elements.

For the same priority packets requested by different nodes, the NC preferably should treat all nodes in a non-preferential manner. The transmission time granted is delivered by the ordinary DAU.

The DAU corresponding to an opportunistic reservation request element is preferably transparent to the receiver node.

When deciding whether, or what payloads, to concatenate according to the invention, the NC shall preferably not violate any inclusion rules as specified above. The NC may preferably schedule concatenated payloads according to the grant sequence rules that follow.

If the NC opts to schedule concatenated payloads, then the MAP message should preferably include a separate DAU for each of the payloads to be concatenated. The DAU for the first concatenated payload shall preferably grant the requested duration, as well as the IFG and PHY-Preamble that was requested in the corresponding request element.

The DAU for the second concatenated payload shall preferably grant a duration corresponding only to the requested payload—i.e., the requested integer number of OFDM symbols—shall preferably specify the IFG_TYPE=0×2 (no IFG), and shall preferably not include timeslots for any IFG or Preamble. DAUs for a 3rd or 4th concatenated payload, if any, shall preferably be granted similarly to the DAU for the second concatenated payload.

For all payloads that are not concatenated, the grant sequence rules as specified above shall preferably apply. Grant sequence rules for concatenated payloads follow.

When granting concatenated payloads from any Flow—i.e., same source, DESTINATION_NODE_ID value in the MoCA Header, and Level of Priority Order—the NC's MAP message should preferably grant DAUs for the Flow in the same sequence as request elements for that Flow were received in the Reservation Request from the transmitting node.

Figure 5:
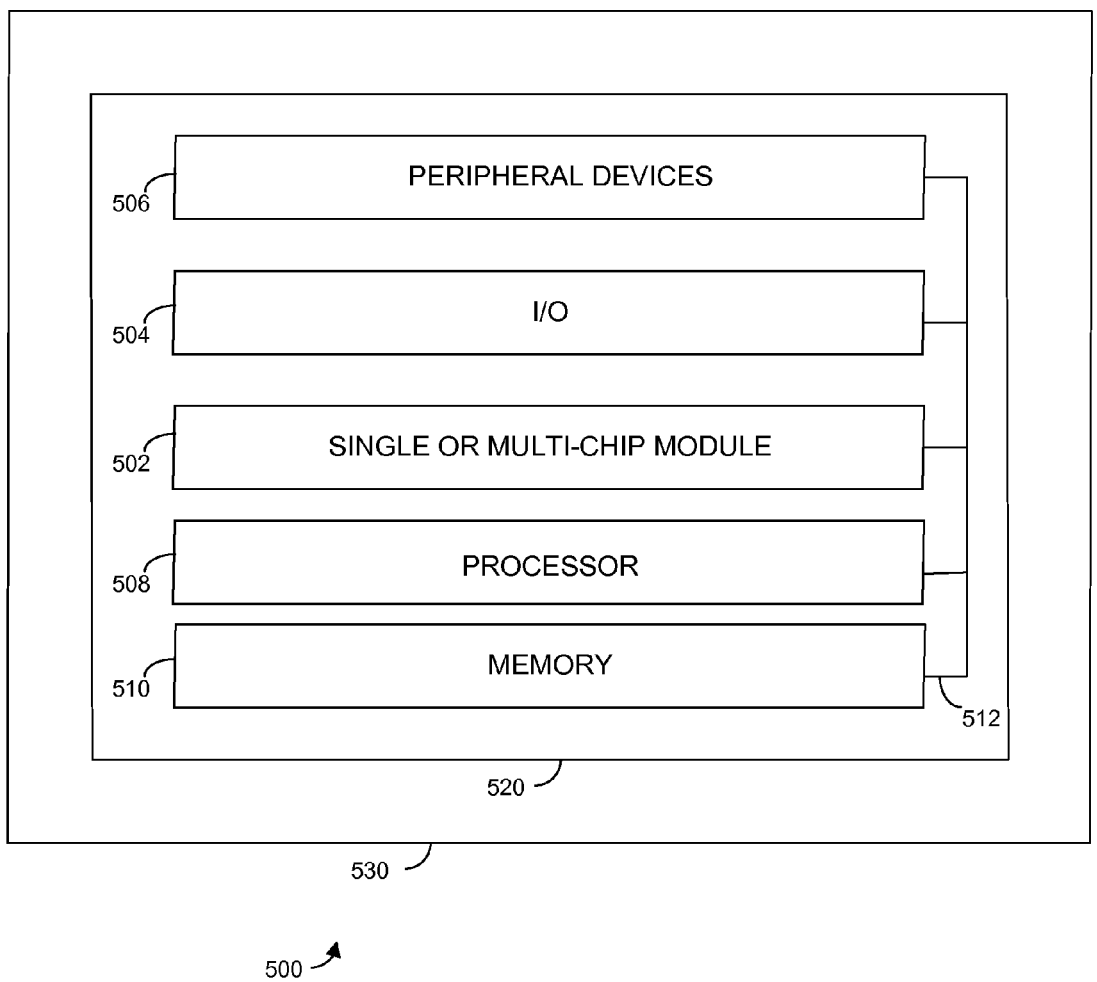
FIG. 5 is a schematic diagram of an illustrative single or multi-chip module of the invention in a data processing system.

FIG. 5 shows a single or multi-chip module 502 according to the invention, which can be one or more integrated circuits, in an illustrative data processing system 500 according to the invention. Data processing system 500 may include one or more of the following components: I/O circuitry 504, peripheral devices 506, a processor 508 and memory 510. These components are coupled together by a system bus or other interconnections 512 and are populated on a circuit board 520 which is contained in an end-user system 530. System 500 may be configured for use in a cable television tuner according to the invention. It should be noted that system 500 is only exemplary, and that the true scope and spirit of the invention should be indicated by the following claims.

Figure 6:
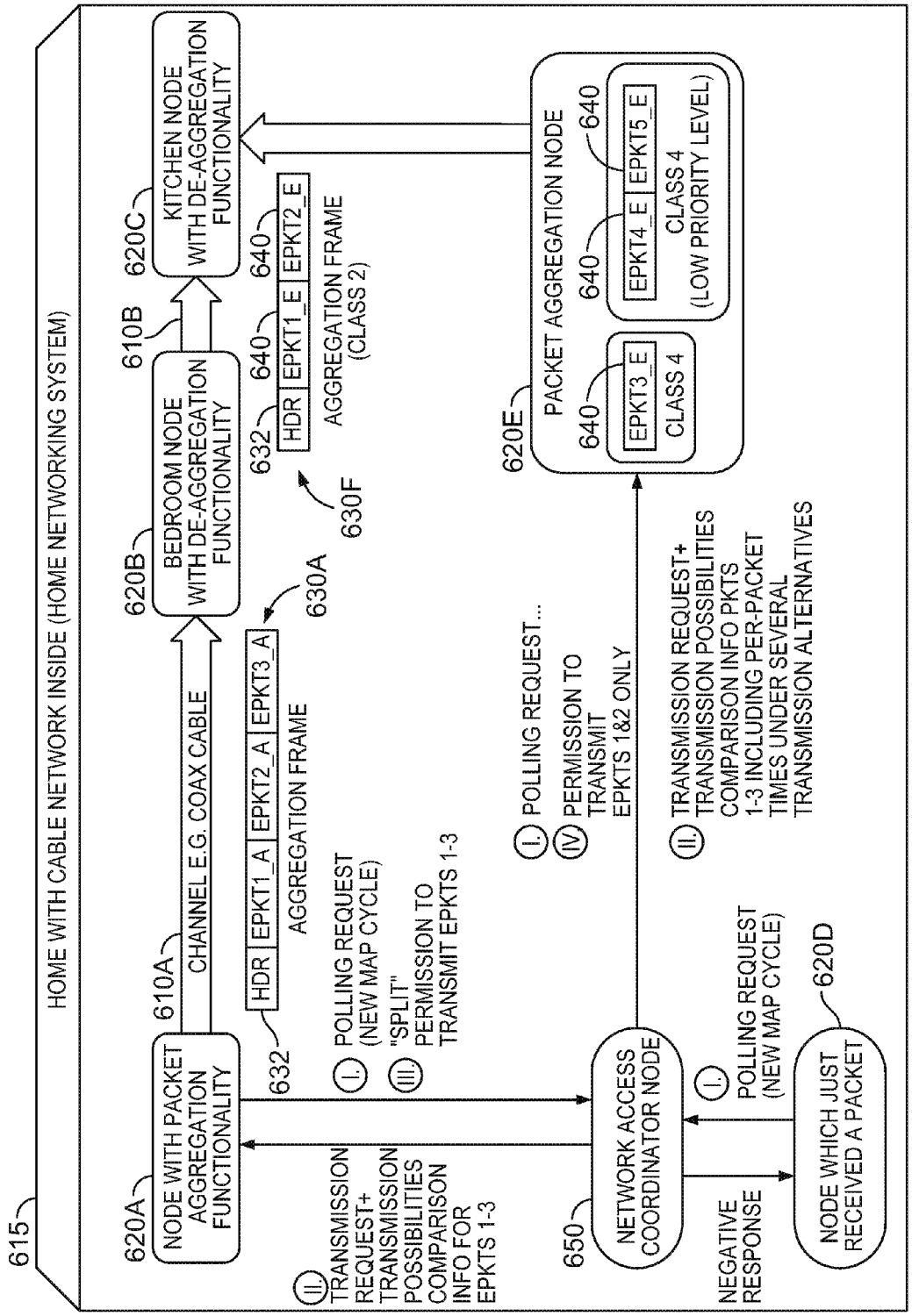
FIG. 6 is a schematic diagram exemplary MoCa network for use with systems and methods according to the invention.

FIG. 6 is a schematic diagram of an exemplary MoCA network for use with systems and methods according to the invention.

FIG. 6 is a simplified block diagram illustration of a home networking over coax system being constructed and operative in accordance with a preferred embodiment of the present invention. The system of FIG. 6 is operative for transmitting packets over a network of communication channels within a home 615 (such as, for example, the channels indicated in FIG. 6 by reference numerals 610A and 610B, referred to collectively hereinafter as "channels 610"). The channels may be wired channels e.g. cables such as coax cables. Also installed in the home 615 at endpoints of the channels 610 is a set of nodes 620 of which five nodes 620A-620E are shown by way of example. At least some of the nodes (620A and 620E in the illustrated embodiment, nodes 620A-620E referred to collectively hereinafter as "nodes 620") have a packet aggregation functionality in which the node forms an aggregation frame 630A, 630F by aggregating a plurality of packets 640 which have accumulated at the node. If at least one packet 640 has accumulated at the node, each node is operative, eventually, to transmit a frame including that packet and perhaps others, typically upon grant of solicited (as in the illustrated embodiment) or unsolicited permission to transmit.

Generally, as described in detail below, the system of FIG. 6 is useful in performing the following method for transmitting packets over a network of communication channels interconnecting a set of nodes. The method may include using a network access coordinator to coordinate access of the set of nodes to the network of channels by granting permission to transmit to individual nodes. The method may further include forming an aggregation frame at one (or more) node(s) by aggregating a plurality of packets which have accumulated at the node. The method may include as well informing the network access coordinator accordingly, and providing the network access coordinator with comparison information comparing different transmission possibilities for the aggregation frame. If at least one packet has accumulated at a node, the method may include transmitting at least one frame upon grant of permission to transmit to that node by the network access coordinator. Each frame may comprise at least one packet. The coordinator is typically operative to determine which portion, if any, of the aggregated packets can be transmitted.

Typically, each node comprises a modem having a CL (Convergence) layer, a Media Access Control layer and a PHY layer and the packet aggregation functionality is performed at the CL layer (at the ECL layer, if the packets are Ethernet packets, abbreviated "Epkts" in FIG. 6).

Each aggregation frame 630A, 630F typically comprises at least some of the following information: an indication that the frame is an aggregation frame rather than a single-packet frame and an indication of the size of at least some of the packets in the frame. This information is typically stored in the header 632 of the aggregation frame. Each packet 640 in each frame typically has a header having CRC (cyclic redundancy check) code for the header itself and CRC code for the content of the packet.

A network access coordinator 650, which may be a node itself, is operative to coordinate the access of the plurality of nodes 620 to the network of channels 610 by granting or refusing transmission requests or by granting unsolicited transmission permission. At least one of the nodes 620 is operative to inform the network access coordinator 650 when it has formed an aggregation frame 630 comprising at least one aggregated packet 640. The network access coordinator 650 is operative responsively to determine which portion, if any, of the aggregated packets 640 can be transmitted.

Typically, as shown, at least one node 620 is operative to send a transmission request and the network access coordinator 650, responsively, selectively grants or refrains from granting permission to transmit. In FIG. 6, for example, node 620A requests permission to transmit three Ethernet packets (aggregated in frame 630A) to node 620B which is located in the bedroom. Permission is granted, albeit in two separate time slots (see steps I, II, and III (slot III which indicates that a split permission is granted)) whose combined length suffices to transmit the three packets Epkt¬1_A, Epkt2_A and Epkt3_A.

Node 620E also requests permission to transmit three Ethernet packets to node 620C which is located in the kitchen (as shown in slot IV). However, coordinator 650 grants permission to transmit only two of these (as shown in slot V). Therefore, packet Epkt3 remains at node 620E for the time being. Nodes 620B and 620C each de-aggregate the frames 630A and 630E that they respectively receive as shown.

Packets 640 may comprise packets of different classes and at least one Tx node 620 may be operative to aggregate packets accumulating at the node, as a function of the class to which the packets belong. For example, in FIG. 6, node 630A accumulated two Class 2 packets, two Class 4 packets aggregated together, and another Class 4 packet not aggregated with the other two. Class 4 is a class of low priority level packets in the illustrated example. The packets in Class 2 may, for example, be characterized by having a common QoS, and/or a common priority level, and/or common membership in a particular flow; and/or any other packet attribute or set of packet attributes. Aggregation "rules" observed by individual nodes may be dependent on class. For example, individual nodes 640 may be operative to aggregate only packets belonging to classes included in predefined classes and to refrain from aggregating packets belonging to classes other than those predefined classes.

Individual nodes 640 may be operative to aggregate all packets which have accumulated at the node between each of the node's transmission requests. This optional aggregation "rule" may refer to any transmission request or may be specific to transmission requests pertaining to a particular class of node.

In the system of FIG. 6, at least one node may be operative to send a transmission request periodically.

The system of FIG. 6 may, for example, operate within or in conjunction with a Home Network modem in general and in particular a home network over coaxial cables such as, by way of example, the home network over coaxial wires as described in the above-referenced MoCA specification. In the MoCA specification, a coordinated home network is described in which an NC exists and coordinates the access to the medium. Only one node is allowed to transmit at a time, creating a non-collision network. This facilitates the ability to carry video as well as voice and data signals over the same network, while retaining the requirements of video and voice streaming and Quality of Service.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A network over coaxial cable, the network comprising:
   a plurality of networked nodes;
   wherein a transmitter of at least one of the networked nodes is configured to transmit a message comprising a concatenated burst, said concatenated burst comprising:
   a preamble;
   a first payload; and
   a second payload wherein the first payload and the second payload are separated by a cyclic prefix of a first symbol of the second payload.

2. The network of claim 1 wherein a networked node comprises a receiver which is configurable to request a message containing a concatenated burst.

3. The network of claim 1 wherein the concatenated burst comprises a third payload, and the second and third payloads are separated by a cyclic prefix of a first symbol of the third payload.

4. The network of claim 3 wherein the concatenated burst comprises a fourth payload, and the third and fourth payloads are separated by a cyclic prefix of a first symbol of the fourth payload.

5. The network of claim 1 wherein the preamble is transmitted following an inter-frame gap.

6. The network of claim 1 wherein a final payload in the burst is transmitted prior to an inter-frame gap.

7. In a network having a plurality of network modules, a method for communicating over the coax backbone between the plurality of network modules, the method comprising:
   transmitting from a first node a concatenated burst message, wherein the concatenated burst message comprises:
   a preamble;
   a first payload frame; and
   a second payload frame wherein the first payload frame and the second payload frame are separated by the cyclic prefix of the first symbol of the second payload frame; and
   receiving the concatenated burst message at a second node.

8. The method of claim 7 further comprising using a networked node configured as a receiver to request a message containing a concatenated burst.

9. The method of claim 7 further comprising including a third payload frame in the concatenated burst, and separating the second and third payload frames by a cyclic prefix of a first symbol of the third payload frame.

10. The method of claim 9 further comprising including a third payload frame and a fourth payload frame in the concatenated burst, and separating the third and fourth payload frames by the cyclic prefix of the first symbol of the fourth payload frame.

11. The method of claim 7 further comprising transmitting the preamble immediately following an inter-frame gap.

12. The method of claim 7 further comprising transmitting the second payload immediately prior to an inter-frame gap.

* * * * *